F. MILLWARD.
High and Low Water Indicator.
No. 6,668. Reissued Sept. 28, 1875.
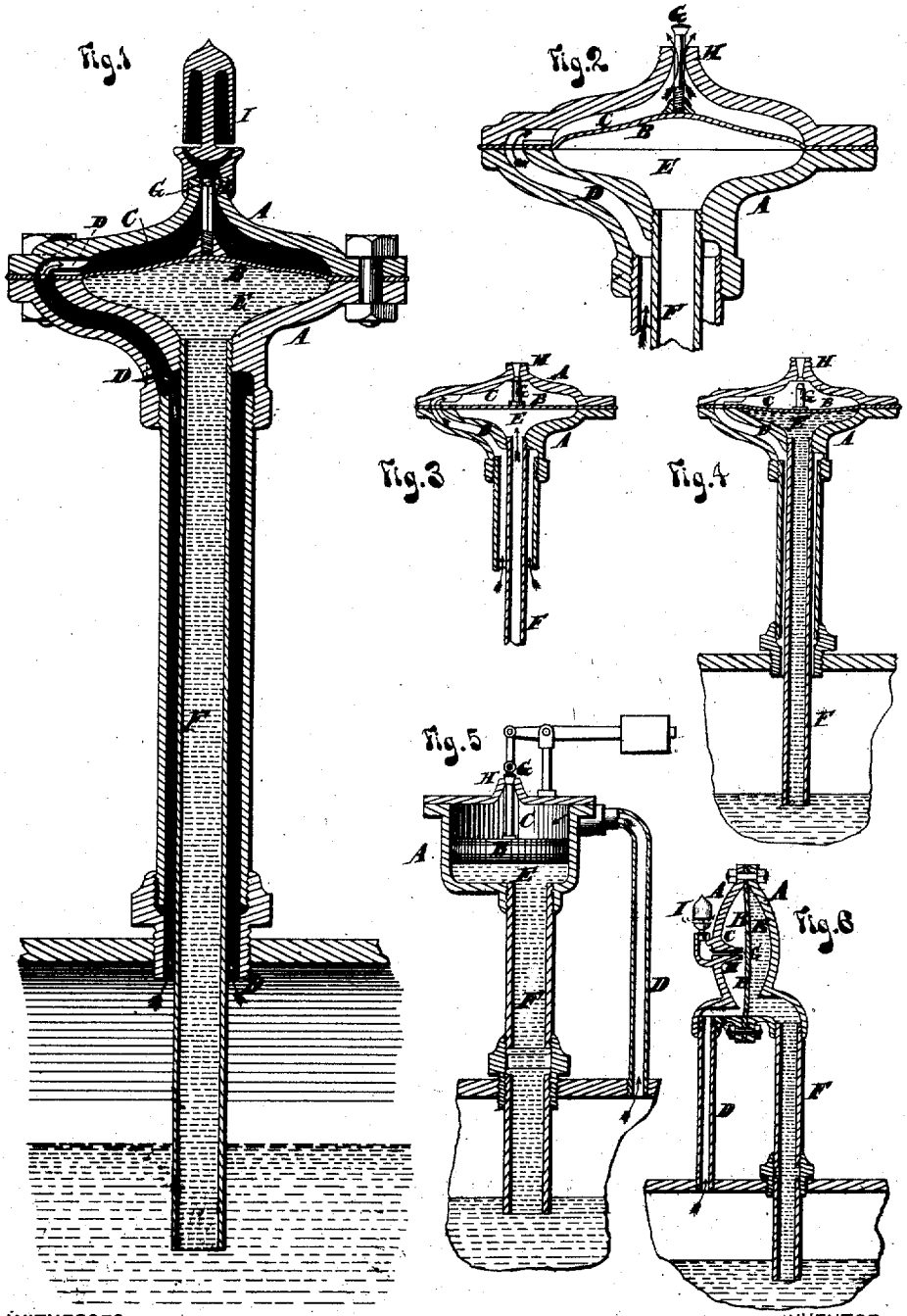
WITNESSES.
A. Rupkert
H. C. Dunning
INVENTOR
F. Millward
by Edw. J. Bill
ATTORNEY

UNITED STATES PATENT OFFICE.

FRANK MILLWARD, OF CINCINNATI, OHIO, ASSIGNOR, BY MESNE ASSIGNMENTS, TO EDWARD BOYD, TRUSTEE, OF SAME PLACE.

IMPROVEMENT IN HIGH AND LOW WATER INDICATORS.

Specification forming part of Letters Patent No. 115,501, dated May 30, 1871; reissue No. 6,668, dated September 28, 1875; application filed May 11, 1874.

*To all whom it may concern:*

Be it known that I, FRANK MILLWARD, of Cincinnati, in the county of Hamilton and State of Ohio, have invented a certain new and useful High or Low Water Indicator for Steam-Boilers, of which the following is a specification:

All water-level indicators for steam-pressure apparatus hitherto used have proved unreliable for continued service. Indicators having an alarm-vent governed by a float either inside or outside of the boiler fail, owing to the lack of power in the float to overcome serious accidental obstacles occasioned by the incrustation of the valve and seat, or the clogging of the moving parts or vent by incrustation or corrosion. Indicators which operate by the gravity of water on levers, of which there are many styles, necessitate the use of joints, which, upon slight corrosion or incrustation, stick, and prevent an alarm. Indicators which operate by a slight expansion and contraction of metals require a delicate, easily-displaced adjustment, which has proved wholly unreliable, even for a short period of time, the parts of the instrument, moreover, being liable to be so clogged with dirt from the boiler in the operation of giving an alarm that a repetition of it at the next occurrence of low water is impossible. Indicators which depend for an alarm upon the fusing of a soft-metal plug have failed in numerous instances, owing to the collection of foreign substances over the face of the plug, and owing to the fusible character of the plug changing with use.

My invention, which embodies a new principle for low and high water-level indicators, is designed to obviate all difficulties heretofore experienced in the reliable indication of the absence or presence of low and high water-levels in steam apparatus, and provides a powerful agent, which operates with certainty and precision under all conditions of steam-pressure, is comparatively free from incrustation, and has no rubbing or moving parts liable to stick.

My invention consists of a case or shell containing two chambers divided by a flexible diaphragm or equivalent, communicating from each side constantly with the pressure apparatus to which it is attached, the pipe which transmits the pressure to one of the compartments leading from a fixed level in the apparatus, so as to provide for the intermittent occupancy and action of gas and water in this pipe, for the purpose of causing a powerful reciprocating motion of the diaphragm by the intermittent action of a hydrostatic column and a suitable retractile force. The hydrostatic action being exerted upon the entire surface of the diaphragm, serves, in conjunction with the retractile force, to create not only the motion necessary to indicate by motion or sound of the attachment to the diaphragm, but to accompany said motion by a force capable of overcoming obstacles under any contingency in use.

My invention further consists in such an arrangement of the pressure-communicating pipes with relation to the compartments inclosing the diaphragm that one compartment is enabled to communicate with the pressure apparatus by a pipe inclosed within the pipe communicating with the other, thus avoiding the necessity for separate attachments to the apparatus for the separate compartments, and permitting the pipes to expand or contract independently.

My invention further consists in the employment of a metallic diaphragm which is capable of retaining its resilient force under high temperatures without deterioration.

Figure 1 is a vertical section of my indicator attached to a boiler for indicating low water, the moving parts of the instrument being in the position occupied when the water in the boiler is sufficiently high. Fig. 2 is a view of the same instrument when the moving parts have changed position to give an alarm, owing to the absence of sufficient water in the boiler. Fig. 3 is a vertical section of my indicator, with the parts arranged for indicating high water, as seen when the water is below high-water mark. Fig. 4 is a view of the instrument shown in Fig. 3 in the act of giving an alarm, occasioned by the presence of too much water in the boiler. Figs. 5 and 6 are modifications in the construction of the instrument.

A is a metallic case, divided into two compartments by a diaphragm, B. A constant pressure is maintained in the compartment C, which communicates with the boiler by passage D. The pipe F of chamber or compartment E is designed for the occupancy alternately of water and steam, it being connected to the boiler and instrument so as to end a the low-water mark in Figs. 1 and 2, and at high-water mark in Figs. 3 and 4. The diaphragm B is constructed to move easily with a slight preponderance of pressure upon one side, and has a valve, G, attached to, forming a part of, or resting by weight upon it, which seats steam-tight against the valve-seat H. The diaphragm is preferably made of metal, for the reason stated, and it, as well as the seat and valve, may be plated with nickel or other material to prevent corrosion. No part of the valve or stem need touch the sides of the aperture for the steam-vent, so that closely-rubbing surfaces, liable to stick upon slight corrosion, can be avoided entirely.

To permit the passage of steam to give an alarm (see Fig. 2) the stem of the valve may be much smaller than the hole in the seat, or squared, as shown, or grooved. It should, in all cases, fit loosely.

Owing to the powerful action of the diaphragm, full confidence can be placed in this instrument for prompt operation in long-continued service. The valve is as certain of action as a nickel-seated safety-valve, and the diaphragm as reliable as that of a steam-gage.

The operation is as follows: When the instrument, in the form used to indicate low water, as shown in Figs. 1 and 2, is attached to the boiler, the steam has a direct and uninterrupted communication with chamber C through passage D. The chamber E (when the water is high enough to cover the end of the tube) is filled with water, and when in this condition the pressure upon the lower side of the diaphragm B is less than that upon the upper side, owing to the presence of the hydrostatic column in pipe F, the downward pressure of which reduces, to an extent in direct proportion to its height, the upward pressure caused by the steam in the boiler. If the vertical distance from the water-line to the diaphragm is but a little over two feet, a preponderance of one pound per square inch will exist on the valve side of the diaphragm, which, when the diaphragm is five inches in diameter inside, will give, after allowing a deduction for the unbalanced boiler-pressure upon the valve, over eighteen pounds to force and keep the valve to its seat. In order to produce a greater difference than this it will be only necessary to increase the height of the hydrostatic column.

When the water in the boiler has been reduced to a point below pipe F, the water in chamber E is discharged, and steam takes its place. The diaphragm is then in equilibrium, except for an area of boiler-pressure upon the lower side equal to the area of the valve-seat, and it then, by retraction to its normal position, and with the assistance of the slight unbalanced boiler-pressure upon the lower side, assumes the position shown in Fig. 2, opens the valve G, and gives the alarm.

A whistle, I, may be attached to the case A, as shown. The diaphragm itself may form the valve, as shown in Fig. 6.

The form of instrument shown in Figs. 3 and 4 is constructed to indicate high water, and it differs from that shown in Figs. 1 and 2 in this only—the valve seats on the inside of the case, and is shut when the diaphragm is exposed to a boiler-pressure of steam upon both sides. It is forcibly opened by a deflection of the diaphragm when there is an unbalanced pressure, due to the presence in tube F of a hydrostatic column.

It is obvious that this instrument may be "piped up" in many different ways, and that its details of construction may be varied without departing from the principle of my invention. Thus, a piston sliding in a cylinder may be used as the dividing diaphragm, operated in one direction by a spring or weight, and in the other by the preponderance of pressure opposed to the hydrostatic-column side of the piston, as shown in Fig. 5.

The instrument may also be attached in place of one of the boiler gage-cocks, and also combine within itself a gage-cock similar to the old combination of gage-cock and other indicators.

In cases where the boiler to which the indicator is to be attached superheats its steam, it is necessary, in most instances, that the pipe F should not be surrounded by a steam-jacket, such, for instance, as is shown in Fig. 1. The attachment of pipe F should then be made to the side of the boiler, and may be in place of one of the gage-cocks, the steam being conducted to the chamber C by a small separate pipe from the top of the boiler.

The diaphragm B may be corrugated radially and concentrically, to induce freedom of action.

In order that air may be expelled from chamber E, when necessary or desirable, to insure the speedy closing of the valve when the boiler is being first fired up, a cock may be inserted near the top of chamber E.

I claim—

1. A method of operating appliances for indicating a water-level, by combining a flexible diaphragm with two compartments separated by the diaphragm, both of which communicate openly with the same pressure apparatus, the pressure in one of them being varied by the intermittent support of a hydrostatic column in the tube leading thereto.

2. In combination with the separate compartments C E, inclosing the flexible diaphragm B, operated by the intermittent action of a hydrostatic column, the pipes D and F, arranged one within the other, substantially as and for the purpose specified.

3. In combination with the compartments C and E, communicating separately with a pressure apparatus, in the manner stated, a reciprocating diaphragm, B, made of metal, substantially as and for the purpose specified.

FRANK MILLWARD.

Witnesses:
D. P. HOLLOWAY,
B. EDW. J. EILS.